(12) United States Patent
Quintavalla et al.

(10) Patent No.: US 10,248,921 B2
(45) Date of Patent: Apr. 2, 2019

(54) ANALYZING AND OPTIMIZING MAINTENANCE OF GOLF COURSES AND GOLF COURSE DESIGNS BY USE OF ALLOCABLE RESOURCES

(71) Applicants: Steven J Quintavalla, Branchburg, NJ (US); James F. Moore, McGregor, TX (US); Scott A. Mingay, Westwood, NJ (US)

(72) Inventors: Steven J Quintavalla, Branchburg, NJ (US); James F. Moore, McGregor, TX (US); Scott A. Mingay, Westwood, NJ (US)

(73) Assignee: United States Golf Association (USGA), Short Hills, NJ (US)

( * ) Notice: Subject to any disclaimer, the term of this patent is extended or adjusted under 35 U.S.C. 154(b) by 417 days.

(21) Appl. No.: 15/145,474

(22) Filed: May 3, 2016

(65) Prior Publication Data
US 2017/0323236 A1   Nov. 9, 2017

(51) Int. Cl.
*G06Q 10/06* (2012.01)
*G06T 11/20* (2006.01)
*G06Q 10/00* (2012.01)

(52) U.S. Cl.
CPC ...... *G06Q 10/06312* (2013.01); *G06T 11/206* (2013.01); *G06Q 10/20* (2013.01)

(58) Field of Classification Search
None
See application file for complete search history.

(56) References Cited

U.S. PATENT DOCUMENTS 5,797,809 A * 8/1998 Hyuga .............. A63B 71/0669
340/323 R
6,321,128 B1 * 11/2001 Costin, IV ............ A63B 69/36
473/131

(Continued)

FOREIGN PATENT DOCUMENTS

| EP | 2019370 A2 | 1/2009 |
|---|---|---|
| WO | 2011108837 A2 | 9/2011 |

OTHER PUBLICATIONS

O'Brien, "Maintenance on a Shoestring", USGA Green Section, Jul./Aug. 1995, pp. 1-4.*

(Continued)

*Primary Examiner* — Thomas L Mansfield
(74) *Attorney, Agent, or Firm* — Andrew S. Langsam; Pryor Cashman LLP

(57) ABSTRACT

A golf course maintenance system and method which comprises the input of a golf course and its shape, size and parameters into a computer-like system. The course is segmented into teeing grounds, fairways, one or more rough areas, water hazards, bunkers, and putting greens. Each such component of the holes and course is calculated into square foot or square yards surface area. Each such component is then calculated for maintenance purposes based upon cost components for maintenances, namely, cost and quantity of labor and Consumables such as fuel, energy, water, chemicals, fertilizers. The Course Officials can input into a CPU connected to a display screen the approximate configuration, length, width, and location of teeing grounds, fairways, rough, water hazards, bunkers, and putting greens. Each of these Course Components is then associated with a set of Processes to maintain them and each Process is associated with cost factors, e.g., labor, consumables resources such as fuel and water, etc. The Course Officials can then consider the modification of the Course Components of the hole(s)

(Continued)

and the course while the CPU calculates and displays the cost and consumed resource savings, if any, by a change in the boundary of the Course Components. Also, the modification(s) to be considered are expected to take into account the frequency that players' shots land or lie in various locations of the Course Components as a set of players are tracked on the actual golf course and those tracked movements are provided to the CPU and/or the Course Officials or other User of the system to facilitate the modification of the Course Components.

12 Claims, 10 Drawing Sheets

(56) References Cited

U.S. PATENT DOCUMENTS

| | | | |
|---|---|---|---|
| 6,409,607 B1 * | 6/2002 | Libit | A63B 67/02 |
| | | | 473/154 |
| 6,456,938 B1 * | 9/2002 | Barnard | A63B 57/00 |
| | | | 701/454 |
| 6,525,690 B2 | 2/2003 | Rudow et al. | |
| 2004/0015367 A1 | 1/2004 | Nicastro et al. | |
| 2005/0108982 A1 | 5/2005 | Formisano | |
| 2005/0119059 A1 * | 6/2005 | Marshall | A63B 69/3691 |
| | | | 473/4 |
| 2007/0072692 A1 * | 3/2007 | Oakley | A63B 69/3691 |
| | | | 473/169 |
| 2010/0286937 A1 | 11/2010 | Hedley et al. | |
| 2011/0246155 A1 | 6/2011 | Fitch et al. | |
| 2012/0222351 A1 | 9/2012 | Kobland | |
| 2012/0276965 A1 * | 11/2012 | Ok | A63B 24/0021 |
| | | | 463/3 |
| 2013/0035992 A1 | 2/2013 | Silverman | |
| 2014/0125651 A1 | 5/2014 | Sharp et al. | |
| 2015/0134545 A1 | 5/2015 | Mann et al. | |
| 2016/0158640 A1 * | 6/2016 | Gupta | A63F 13/213 |
| | | | 463/3 |

OTHER PUBLICATIONS

First Examination Report in Australian Patent Application No. 2017232244 (dated Dec. 5, 2017).

Moore, "Building and Maintaining The Truly Affordable Golf Course," USGA Green Section Record 37(5):10-15 (1999).

Kuiper, "Application of current environmental research to golf course design, construction, and management practices," Iowa State University Retrospective Theses and Dissertations (1997).

Nuzzo, "Golf Design Tools: PAD Versus CAD," Golf Architecture: Journal of the Society of Australian Golf Course Architects 9:5-7 (2006).

Extended European Search Report in EP Patent Application No. 17746362.7 (dated Apr. 23, 2018).

* cited by examiner

APP- SETTING

USG4 RESOURCE MANAGEMANT APP

DASHBOARD  MAP

SETTINGS
CONSTANTS
FEATURES
ACCOUNT SETTINGS

ENERGY COSTS

| UNLEADED | 2.5 | REMOVE |
| DIESEL | 3.25 | REMOVE |
| PROPANE | 5 | REMOVE |
| ANNUAL PUMPING ENERGY | 250 | REMOVE |

ADD ITEM

LABOR COSTS

| LEVEL 1 | 10 | REMOVE |
| LEVEL 2 | 15 | REMOVE |

ADD ITEM

MATERIAL COSTS

| FERTILIZER | 200 | REMOVE |
| PESTICIDE | 100 | REMOVE |
| OTHER CHEM | 100 | REMOVE |
| SYNGENTA PRIMO | 25 | REMOVE |

ADD ITEM

EQUIPMENT COSTS

| ROUGH MOWER | 1 | REMOVE |

SAVE  CANCEL

*FIG. 8*

ANALYZING AND OPTIMIZING MAINTENANCE OF GOLF COURSES AND GOLF COURSE DESIGNS BY USE OF ALLOCABLE RESOURCES

FIELD OF THE INVENTION

The present invention relates to a system for analyzing the maintenance of golf courses (whether 9, 18 or another number of holes) and golf course designs, including the location, shape and area of the teeing ground, fairways, rough, water hazards, bunkers, holes and putting greens (hereafter collectively referred to as the "Course Components"). The present invention utilizes a virtual replication of an actual course to be maintained which then allows those people responsible for the maintenance of a golf course (hereafter "Golf Course Maintenance"), e.g., the maintenance staff, golf course architect, course superintendent, golf club manager and/or its members (hereafter collectively referred to as the "Course Officials"), to allocate resources to maintain the course and to consider places and Course Components to modify, including individual holes, and to properly allocate resources to maintain such Course Components.

Golf Course Maintenance is a very expensive undertaking. The costs include, but are not limited to, labor, equipment, water, energy (electric or fuel), chemicals (e.g., plant protectants), fertilizer, and the like. Today, golf facilities are under pressure to maintain their courses' playability, beauty, challenge and enjoyment, while at the same time capping or conserving monetary expenses. Indeed, in some parts of the United States, golf courses are also under pressure to conserve valuable water resources as there is a perception that watering large areas of turfgrass is a waste of precious water and cannot be justified where the benefit is limited to only those people who take advantage of the course.

There is a real need to allow for Golf Course Maintenance which retains the course's playability, beauty, challenge and enjoyment within a budget but also allows the Course Officials to make choices as to changes to be made to the Course Components. These include the size, shape and location of the teeing grounds, water hazards, bunkers, and putting greens and the width and length of fairways and rough. The present invention provides a virtual representation of the actual golf course and its holes under consideration and calculates, by standard algorithms, the cost and consumption of key resources to maintain each of the Course Components, as well as the overall or total cost of maintaining the entire course. Based upon such calculations, the Course Officials can, on the virtual representation of the golf course and its holes, consider modifying the location, shape and area of the Course Components. As they do so, the software will provide the Course Officials with instant re-calculation of the maintenance costs and resource consumption of the Course Components as reallocated.

For example, it may be that separating the teeing ground from the short fairway grass by an additional fifty yards of short rough, instead of continuous short fairway grass commencing at the end of the teeing ground, could result in significant annual maintenance savings. Similarly, converting irrigated rough to non-irrigated rough can result in the conservation of thousands of dollars and millions of gallons of water annually.

According to the present invention and its preferred embodiment, a golf course is played by a minimum number of players, with a Handicap Index ranging from high to low, for a period of time. A record is made, electronically and wirelessly (preferably), of the location of golf balls after the players have taken their shots. The locations most likely to receive the balls are likely to need to continue to be playable and require a higher degree of care. In contrast, if balls rarely if ever land in certain locations of the course, that location may be under consideration for a lower grade of maintenance, e.g., possibly the grass should be converted from short fairway grass to a first level of rough ("Rough 1") or from a first short level of rough to a higher level of rough ("Rough 2"). Both conversions would save money in annual maintenance. Similarly, the shape and contour of a hole may be changed potentially resulting in the need for less watering of the area.

Utilizing the present invention and its preferred embodiment, the Course Officials can consider various ways to reconfigure the course, hole by hole, so that, among other things, their maintenance budget, as well as the playability, beauty, challenge and enjoyment of the course, are maintained. The Course Officials will visually make the proposed changes to the virtual course on the computer by use of a cursor and a monitor (for viewing). The computer's processor ("CPU") and the software will provide new estimates for the maintenance on a continuous basis as each of the changes are visually implemented on the screen. When the course is redesigned or changed as required or desired by the Course Officials and the maintenance costs for the redesigned or changed Course Components are understood by him or her, the Course Officials can then cause the proposed changes to be implemented to the actual course.

The calculation of anticipated expenses of maintaining, changing and redesigning the Course Components will allow for reallocation of available resources, including both expensive and inexpensive labor, grass seed, equipment, water, energy, chemicals, plantings, and the like. The present invention facilitates the maintenance of a real golf course by simulating its use and maintenance and allowing the Course Officials to change as desired one or more Course Components and to determine the expected cost savings or increased costs, if any, for each change before implementing the change on the actual course itself. By use of the collected data on probabilities of where golf balls land after being hit by a variety of players, the impact of the redesign or change on the course's playability, beauty, challenge and enjoyment will be understood and likely minimized.

Ensuring that Course Components are maintained is critical. Using the present invention to ensure that a course will be maintained and the maintenance costs can come in under budget is vitally important. Reallocating resources with cost components is one way to maintain a course along with its playability, beauty, challenge and enjoyment.

The invention provides a virtual representation of a golf course on a computer, tablet, smartphone or similar device. Each hole of a golf course has several regions (including the Course Components, i.e., teeing ground, fairways, rough, water hazards, bunkers, and putting greens) which the Course Officials or any other user (hereafter sometimes collectively referred to as the "User") can designate and change by using the cursor and selecting and moving points demarking the particular area of the virtual hole, during which time the processor will simultaneously provide an update on the increased or decreased costs, if any, to maintain such redesigned area. The reconfiguration can be achieved while ensuring that few if any golf balls are likely to be hit into the rougher and/or unplayable areas which require little or no maintenance. This is accomplished by use of data previously obtained from several (above a predetermined minimum) actual players with a Handicap Index ranging from high to low whose actual and thus likely location on the course, e.g., fairways, putting greens, rough, water hazards, bunkers and out of bound areas, can be initially tracked by smart phones, geolocators and other similar devices. Probabilities of where balls likely come to lie thus can be used as inputs to where changes to the Course Components can or should be made without impacting upon too many players.

Each of the several regions on the course and holes has their own unique associated expenses for labor and materials. Each region must be considered in order to accurately estimate the cost of maintaining the course. Putting greens, for example, require regular mowing and watering, while bunkers instead require sand, and grooming. Fairways may require seeding, mowing, fertilization and irrigation. The rough also needs to be maintained because there are often degrees of rough, i.e., Rough 1 and Rough 2, with increasingly higher levels of grass as one progresses outwardly from the fairway. All of these regions cost the course and/or club funds to maintain and consumes resources.

The overall cost of a golf course is dependent upon the surface or ground area of each of these regions, which can be very difficult and time-consuming to calculate. As Golf Course Maintenance costs can become quite expensive, it is important for the Course Officials to anticipate and plan for such costs. The present inventive system calculates the surface area of each region and takes the different needs of such region into account in order to determine the estimated cost of maintaining the entire course. The present inventive system provides variables to be adjusted (such as the shape and size of the areas and the location of teeing ground, fairways, rough, water hazards, bunkers, putting greens, and out of bounds) in order to decrease, maintain or increase the expenses of annual, monthly, weekly or even daily Golf Course Maintenance. This is done while attempting to ensure that minimal impact is made upon the players.

The present invention represents each region and Course Component of the golf course as a geometric two dimensional polygon. Each polygon is a graphic-like representation of its actual area on the golf course or a hypothetical golf course. The invention calculates the area of given polygons using known methods, e.g., Euler's method. The User may change the size or shape of the polygons in the system as he or she wishes. Each polygon is then assigned a type, e.g., putting green, teeing ground, fairway, by the User. The system calculates the cost to maintain each type of region (based on surface area and the need to maintain that type of Course Component) on the course per unit area given the geographical location of the course. This estimation accounts for the various expenses required for each type of golf course region or Couse Component, including labor, resources and machinery.

Given the size of each polygon as determined by the User, the system calculates the area of each polygon and its estimated maintenance cost based on its area. The system can also take into account other factors such as added expenses for complicated shapes. The User may then virtually adjust the polygons or reassign their type based on this estimated cost. The adjustments will change the area of the polygons—and therefore their costs—which costs will automatically be recalculated by the system. The User can then determine the most cost efficient layout of the golf course by adjusting and reassigning the various areas of the course.

Preferred embodiments of the invention also include player tracking to indicate to Course Officials which portions of the course are most frequently used. This enables the Course Officials to concentrate resources on the most used and visible portions of the course.

The present invention can have a graphical user interface of many different types. There can be, for example, pull down menus providing instructions for facilitating the entry of data and for guiding the User.

BACKGROUND OF THE INVENTION

Golf is an internationally popular game played outdoors on a cleared, primarily grass-covered property between 50 and 500 acres in size. The property consists of between nine and eighteen holes on which the players play. In order to vary the holes, each hole has different ground elements. Thus, while each hole has a teeing ground and a putting green, holes may also have rough, water hazards, bunkers, and other elements to challenge the players and maintain their courses' playability, beauty, challenge and enjoyment.

Golf courses have grown in popularity as of late and with this increased popularity have sprouted not only new golf courses, but also a focus on maintaining existing golf courses. Golf Course Maintenance can be extremely expensive and complicated for a variety of reasons. For example, the grass, in order to remain green, robust and healthy over the golf season, requires treatment and attention including proper watering, fertilizing, and regular mowing weekly and sometimes more often. Other areas of the course similarly require attention, e.g., trees surrounding the course must be maintained and overgrowth prevented; bunkers must be kept neat and clean; cart paths and walkways must be kept in good condition, and ornamental plantings maintained. The majority of the cost of this upkeep is dependent upon the area of each of the elements and Course Components discussed above, as each has its own needs and costs.

All of the above varying factors make it very difficult for Course Officials to easily estimate or cost out the Golf Course Maintenance for a given course. Course Officials have limited knowledge of those locations of the course which players will frequent the most or the least and therefore cannot predict those locations where maintenance is most and least required which may therefore cause Golf Course Maintenance to be unnecessarily costly. In addition, there may be areas that players frequent more often than Course Officials appreciate and thus require more maintenance.

Many estimates of Golf Course Maintenance costs and the amount of resources consumed made by Course Officials are broad and do not take into account how small changes in the Course Components will affect cost and resource consumption. The present invention, however, provides the Course Officials with near accurate estimates of the annual maintenance cost of a golf course and the amount of resources consumed based on the area of each region of a hole and demonstrates how design changes can impact these variables before actually implementing the changes. It also tracks players to enable the Course Officials to put resources into the most heavily played areas of each hole. These features of the present invention are highly desirable to Course Officials and others who desire to create and maintain a cost and resource-efficient golf course.

DESCRIPTION OF PRIOR ART

Polygon estimation to determine the area of a given shape has existed for centuries and can be traced back to Newton. Through the years, scientists and mathematicians have continued to develop the process.

Polygon estimation uses a polygon to closely estimate the initial size of a given shape and then slowly continues to more accurately approximate the area of the shape by adding to or substituting from the initial estimation several smaller polygons of estimated area, eventually getting infinitesimally closer to the actual area of the given shape. This technique works particularly well for otherwise difficult to calculate shapes, e.g., kidney, curved edges, or other non-traditional shapes. Other techniques, such as integrals, have also been developed to accomplish this purpose.

Similarly, optimization software for optimizing various resources such as money or time exist in many applications and are often customized for the user. No such optimization exists on the market today, however, for Golf Course Maintenance. Further, no known software exists for tracking players to determine the locations of the golf course that receive the most attention and play. Providing these features in an invention would therefore be beneficial in both reducing costs and conserving resources.

SUMMARY OF THE INVENTION

The present invention is a system for designing and/or modifying a golf course based on the cost of annual maintenance and the annual consumption of resources (including water, fuel, energy, labor, fertilizer and chemicals). It provides estimates for the cost of each type of Course Component on the course and, using that estimate and the desired locations of the Course Components and the players' likely lies on the course, determines the estimated annual Golf Course Maintenance cost and resource consumption. The invention can estimate the cost and resource consumption of an existing course or a hypothetical golf course.

To estimate the cost of Golf Course Maintenance and amount of resources consumed, the user first segments the course into polygons and designates each polygon as a certain type of region or Course Component of the hole, e.g., teeing ground, fairways, rough, water hazards, bunkers, and putting greens. Each of these regions is referred to as an "Attribute" and each polygon may only be assigned one Attribute. The system then estimates the surface area and the cost of maintaining each type of Attribute per a unit measurement.

For example, a given green may need to be mowed five times a week, watered three times a week, and fertilized once every two weeks. Each of these activities is called a "Process" and each Attribute may be assigned an unlimited number of Processes. These Processes incur expenses for labor, fuel, energy, water, chemicals, fertilizers, and other management practices. These expenses are referred to as "Consumables" and are associated with the Processes.

The system takes into account all of the Processes and the Consumables associated with them and estimates the cost of the sum of the Consumables per a small area per Attribute. The system also calculates the area of each given polygon using well known techniques and formulas such as integration or Euler's method. Using the calculated area, the invention is able to estimate the maintenance cost for each area. As each area is assigned an Attribute, the maintenance cost of the entire course can be estimated. Thus, by simply choosing the type of area (Course Component) of each polygon, the User can determine the maintenance costs and resources consumed of the entire course. The invention is also, in some embodiments, able to take into account other factors when determining cost, such as the additional costs associated with a complex polygon or shape or cost increases which are incurred due to the geographical location of the course.

The User can also alter the size, shape, or type of each polygon to lower or increase the cost as desired. For example, a User may reduce the size of an area of irrigated rough while increasing the size of non-irrigated rough. The User will be able to carefully alter each individual polygon, including specifying separate maintenance schedules for each polygon, in order to reduce the costs of the course and consumption of resources to an appropriate or desired amount.

Preferred embodiments of the invention also include player tracking to indicate to Course Officials which portions of the course are most frequently used. This tracking enables the Course Officials to concentrate resources on the most used and visible portions of the course. Player tracking may also include advanced analysis such as color-coding for the amount of time spent on a hole or on one area per resource used, or money spent per area.

BRIEF DESCRIPTION OF THE DRAWINGS

FIG. 8 is another illustration of a potential embodiment of a user interface of the system, which in this case enables the User to enter costs for energy, labor, material and equipment for the particular golf course.

DETAILED DESCRIPTION OF THE INVENTION, DRAWINGS AND PREFERRED EMBODIMENT

Figure 1:
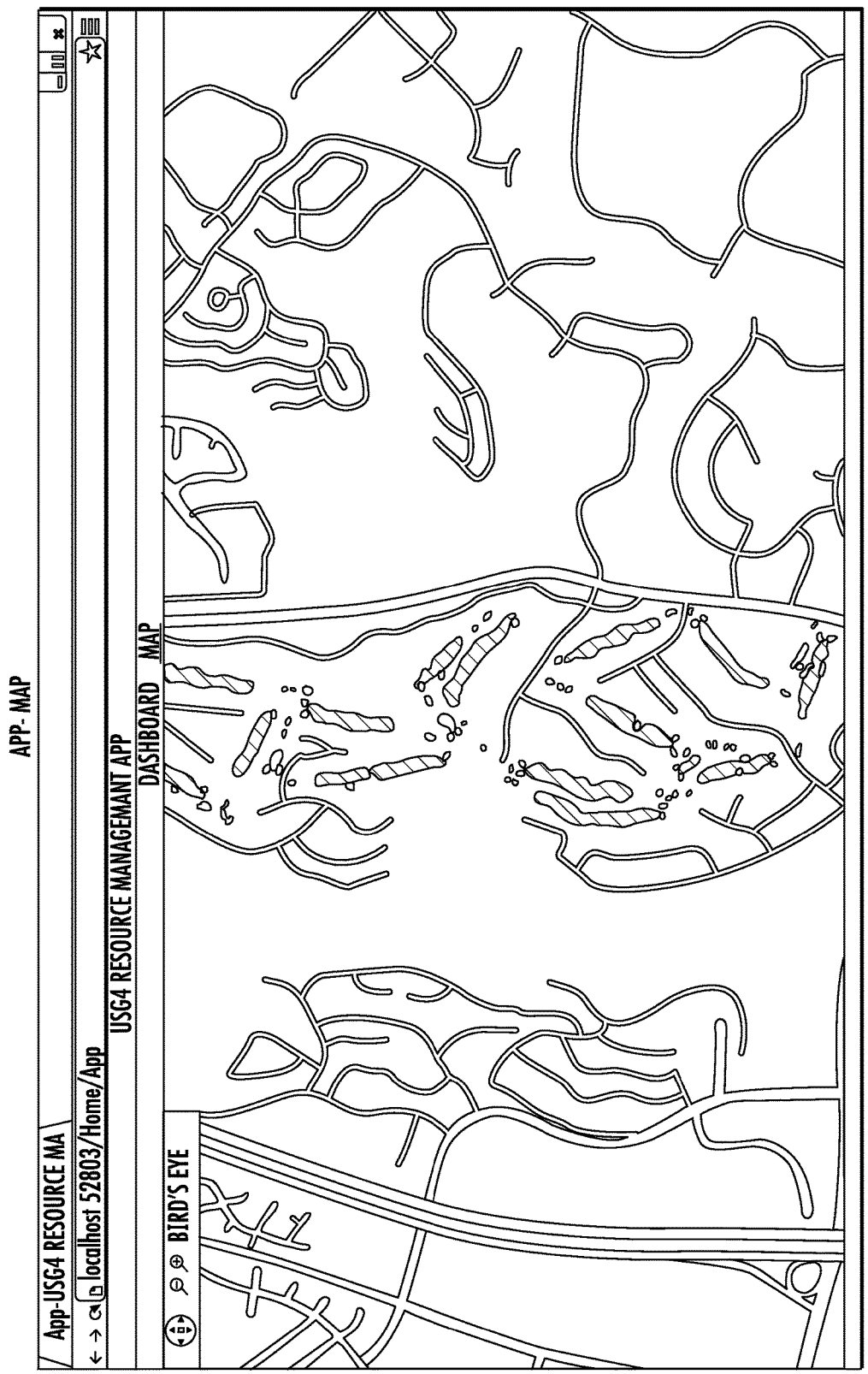
FIG. 1 is an illustration of an overview of a golf course showing fourteen holes designated by blue polygons, each with several movable yellow vertices along the boundaries of the Course Components which can be used (picked up, moved and then dropped by a computer interactive device) to virtually reshape the holes of a course.

As best seen in the Drawings (FIGS. 1-10), the present invention is a computer application for use on a desktop, laptop, tablet, smart phone, or other similar device which enables Course Officials to understand and calculate the costs of maintaining one or more Course Components and to use the information to virtually redesign, modify or create Course Components, knowing the approximate costs and resources consumed for maintaining such Course Component or golf course.

The application is meant to be interactive, allowing the Course Officials or User to input, among other things: (a) the basic parameters and shape of the holes of the course under consideration; (b) the local costs of different types of labor; (c) the costs of various materials such as fertilizer, water and chemicals; and (d) the costs associated with other aspects of course maintenance. The visual readout or dashboard will allow Course Officials to understand, for example: (a) what it costs to maintain Course Components; (b) how frequently various sections of the course are visited by players; (c) how to consider changing the configuration of the course, hole by hole; and (d) how the changes being proposed or considered will impact the overall maintenance of the course.

The golf course is made up of multiple "holes" for the playing of the game of golf. Each hole is comprised of a teeing ground and a cup in a putting green located many yards away—generally between 50 and 600 yards and, most commonly, between 90 and 550 yards.

A course is generally comprised of 18 holes, although some courses are only 9 holes. The shape of each hole of the course is for the most part unique, but generally the holes have certain constants, e.g., they start with a teeing ground on one end, followed by a fairway area, and terminating with the hole on a putting green. Shorter holes may not have a fairway.

Alongside the fairway and putting green for each hole may be rough areas of higher or thicker grass and one or more water hazards or bunkers.

Fairways are generally long and wider than the teeing ground. The distance between the teeing ground and the putting green of the same hole is usually covered by a combination of fairway grass, rough and hazards, the latter generally taking the form of water (a small lake or pond) or bunkers.

On the sides of the fairways are often areas of rough (Rough 1), followed by an outwardly thicker area of rough (Rough 2), and commonly woods or trees. In some cases, adjacent to the fairway of the hole is another fairway for another hole.

A portion of a golf course shown from a bird's eye view (only 14 full holes are visible) is seen in FIG. 1. Each fairway is shown in blue or with horizontal lines, and the bunkers are shown in yellow or vertical lines. The teeing grounds are shown in red or with cross hatching, while the putting greens (no cup is shown as the same may be moved on the putting green from day to day or week to week) are shown in green or with dots thereon. The configuration, length, curvature, shape and location of the teeing ground, fairways, water hazards, bunkers and putting greens as seen from a bird's eye view are shown in FIG. 1. The computer program will allow the Course Officials to input information via hard data and sketches, reading of photo overlays, or other similar methods of inputting various items of information. This will generate a bird's eye view of a virtual course which generally corresponds to the length, width, shape and curvature of each section of the hole for the course, i.e., the Course Components. This is the starting point for the application. The means of entering the necessary information may vary. The course can be "built" virtually by using a set of graphical axes on a screen which the Course Officials can then modify to coordinate what is seen on the screen with the actual course. Other methods of inputting the information to "build" a virtual replica of the actual course can be provided.

A component of the present invention relates to providing information to the program/software which identifies those locations of the course, hole by hole, where players travel to, seeking to find their hit ball from the teeing ground and to hit their next shot, or from their second shot to their third shot, etc., as the players try to hit the golf ball into the cup on the putting green. Towards that end, many players of a variety of abilities with a Handicap Index ranging from high to low are provided with geo-location devices on their bags, carts, clubs, shoes, clothing or even golf balls. The geo-location devices are secured to any one or more of these items and transmit a signal(s) showing where on the hole of the course the players travel to seeking their ball and to play their next shot. The devices transmit a signal to sensors located about the course, which then retransmit the signal (or record the signal to memory devices), which are then collected and analyzed by a computer. Frequency and thus probability of where golf shots lie is thus determined by the system based on historical data.

In addition, a plotting of the amount of a player's strokes or their travel by foot or cart seeking their shots is developed and that information becomes part of the data input into the present invention. This data will facilitate the modification of a hole (and other holes on the course) because the Course Officials can see, based on the input data concerning how frequently players or their golf balls are in a particular location, how changing the shape or the nature of the Course Component will likely impact on the hole's playability, beauty, challenge and enjoyment.

For example, if the data on player and ball location reflects that few shots are hit to the left on a dogleg right hole, that portion of the fairway may be a candidate for modification from lush fairway (expensive to maintain) to a first level of rough (Rough 1) (considerably less expensive to maintain). Alternatively, if many players on a dogleg left hole hook their shots into a dense tree area on the left of the fairway, the Course Officials may decide to change the wooded and tree section to an area of rough adjacent to the fairway, near where a large portion of hit balls will likely land. Similarly, if the players on a hole generally hit their first shots at least 75 yards from the teeing ground, then the Course Officials may consider changing the area between teeing ground and 70 or so yards downhole from fairway into rough, the latter being far less expensive to maintain.

Figure 10:
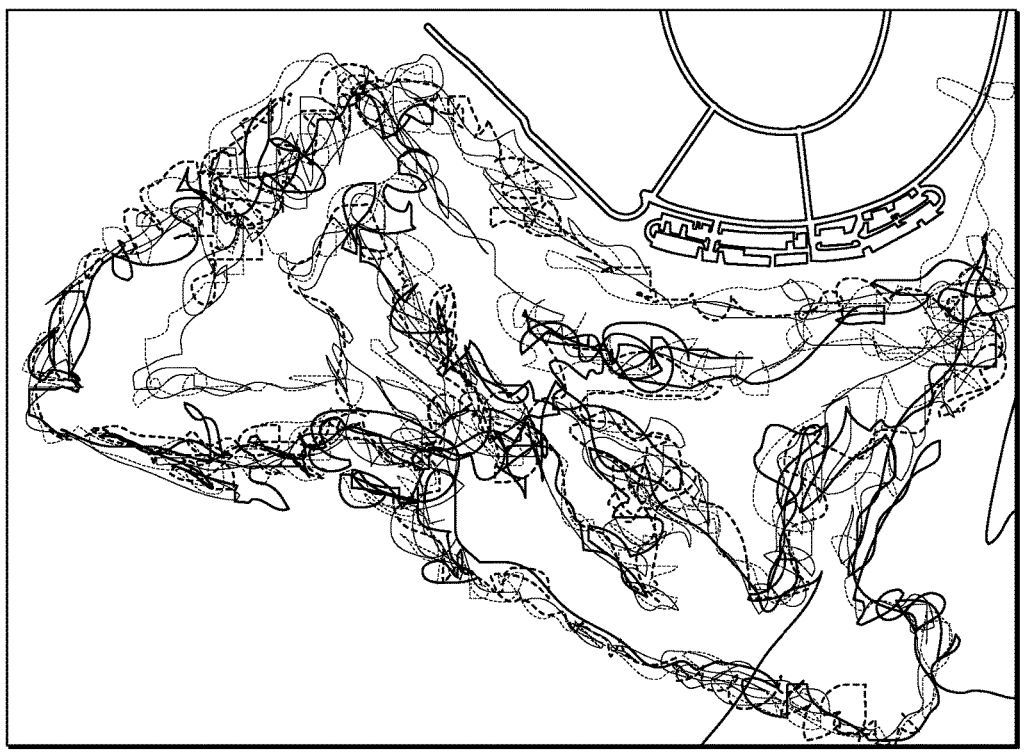
FIG. 10 is an illustration of the player tracking feature of the invention, which documents the movement of the players on the course by assigning a color to each player and indicating the progress of the player by representing his positions on the course in that color. The positions of all players may be shown at once to show which portions of the course are frequented and which are not.

The input of data concerning the likely locations of the balls hit by a large number of players about the course is considered helpful to the modification of the Course Components and the conservation of valuable maintenance dollars, all while seeking to preserve a playable, beautiful, challenging and enjoyable course. FIG. 10 shows a visual overlay provided by the software and the computer from the data recovered from a large group of players with a Handicap Index ranging from high to low as they play the course. The Computer can take that data and create a line corresponding to the average player and surround the average line by adjacent lines, corresponding, for example, to one, two or three standards of deviations from the average. This data can be graphically used by the Course Officials in considering where to modify a hole for the purposes of decreasing or maintaining the costs of maintenance and resource utilization while preserving the course's playability, beauty, challenge and enjoyment.

Based on the data which is input regarding the holes, including the location, shape and dimensions of the teeing ground, fairways, rough, water hazards, bunkers, holes and putting greens, the computer will use one or more algorithms to calculate a reasonably close estimate of the surface area for each of those Course Components for each hole. The computer's software will preferably use a polygon matching system as the surface area of a standard polygon, e.g., rectangle, square, trapezoid, triangles, is easily calculated. The computer can "fill in" the shape of each hole, from the teeing ground through the fairways, rough, water hazards, bunkers, and to the putting greens with rectangles, squares, circles or partial circles, triangles, parallelograms, trapezoids, etc. until substantially the entire surface of the hole is covered with these polygons. The polygons are then summed together for each component of that hole to derive a reasonably close estimate of the surface area covered by the Course Components. Total surface areas for each hole are calculated in this manner and then the entire course and its components can be added together to arrive at the total surface area for the golf course.

Figure 2:
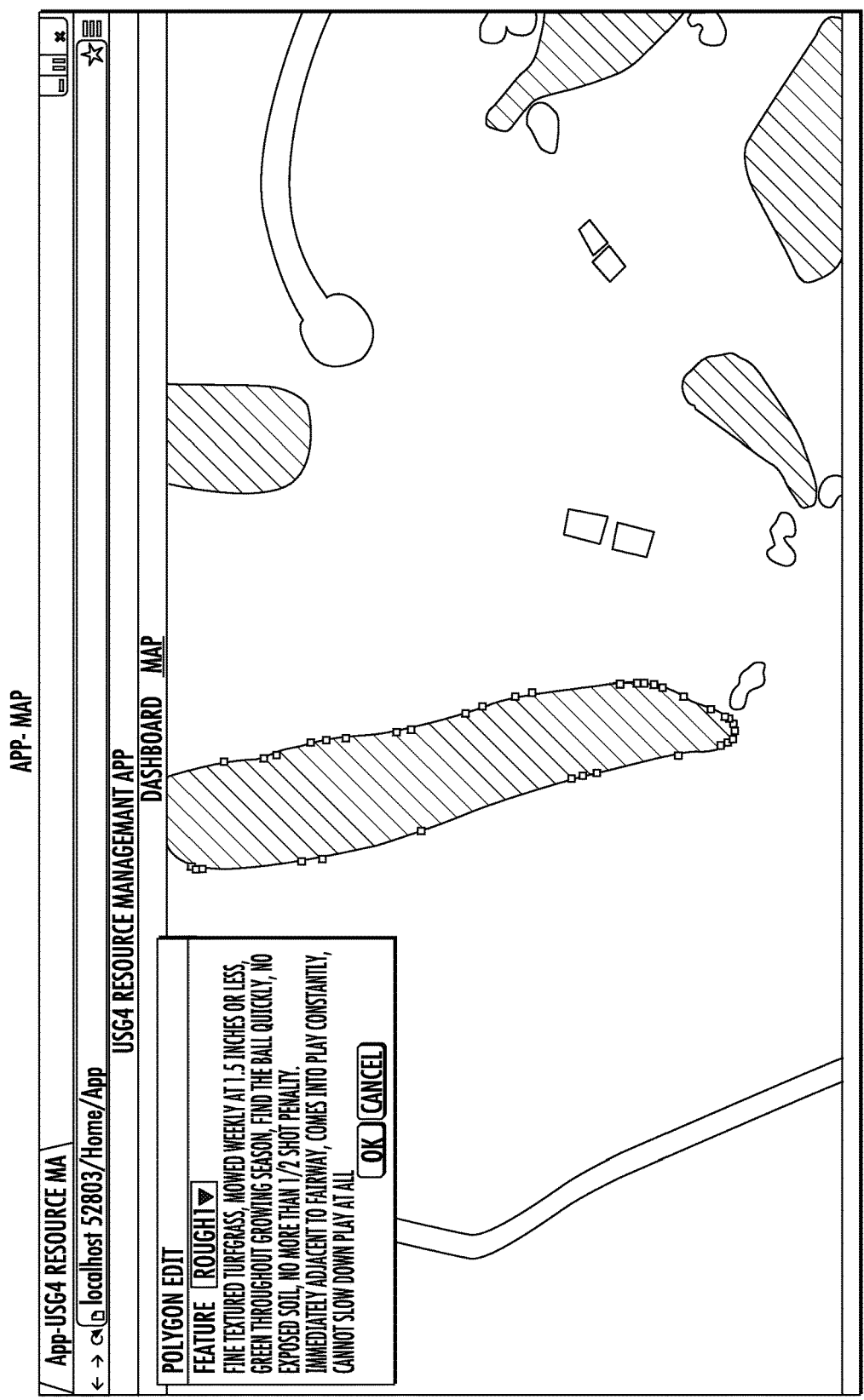
FIG. 2 is a detailed view of one hole showing various regions of the hole in blue, green, red, and yellow polygons with small yellow vertices that can be used to reshape the virtual hole.

In addition, as seen in FIG. 2, the holes, each comprised of the usual Course Components, i.e., teeing ground, fairways, Rough 1 and Rough 2, water hazards, bunkers, putting greens, and out of bounds areas (defined by boundary lines) are each provided with one or more "pick up" points, generally at the boundaries of the particular component. As shown in FIG. 2, many pick up points on the boundary of the current fairway are visible. These pick up points are generated by the computer software, likely based on the corners, vertices or other parameters which define the area of the polygons used in the surface area calculation. FIG. 2 shows the fairway surrounded with many pick up points, including the putting green at the end of the fairway and hazards at the downstream end of the fairway. Also, towards the bottom right of FIG. 2, a shorter hole is displayed with a red teeing ground, a rough area between the teeing ground and the beginning of a lush fairway, and then a green and three distinct bunkers or hazards. No pick up points have been established as yet on that hole.

The pick up points on the hole are usually centrally located on the boundary as in FIG. 2 and can be points for the Course Officials to use in considering modification of the course. The Course Officials can use the mouse or cursor implement to select a pick up point (shown as small white boxes on the perimeter of the fairway) and drag that pick up point, i.e., white box, to a new location and then drop it there. Doing so will not only move that box, but will also move the adjacent boxes so as to maintain the general boundary of the fairway. In effect, the selecting (i.e., picking up), dragging and dropping of the pick-up point are intuitive so that the boxes are connecting the outside perimeter or boundary of the fairway area.

For example, on the right side of the fairway (viewing it from above) there are three pick up points about 100 yards downstream of the teeing grounds (which are not shown). If the center of the three adjacent boxes is selected/picked up and dragged slightly towards the central axis of the fairway in order to narrow the fairway and then dropped there, the fairway will be narrower, but the outer boundary of the hole will still be maintained as a continuous line. This narrowing by the Course Officials will result in a new or recalculated surface area for the fairway. The fairway will decrease in surface area (and estimated cost of maintenance) but the adjacent rough (Rough 1) will correspondingly increase in surface area (as will its estimated maintenance cost, but the cost should be a savings since the cost to maintain rough is less than the cost to maintain fairways). The algorithms of the software will continuously calculate the new surface area of the fairway and Rough 1, as the pick-up box is selected and then dropped. All the while a continuous outer boundary is shown on the virtual representation of the Course Components and the pick-up boxes will still extend along and upon that outer boundary. Throughout this process, the software will continue to calculate the surface areas of all of the Course Components of the hole.

Similarly, pick up points can be provided for the teeing ground (the most proximal tip area of the fairway leading up to the putting green), rough, water hazards, bunkers, and putting greens. These too can be graphically changed by the Course Officials on the virtual course. As the Course Officials implement these proposed design changes to the hole and/or course, the software continually updates the surface area of the new components and the anticipated Golf Course Maintenance costs. The software of the present system allows the Course Officials or other User the option of "saving" the changes, reverting back to the original configurations of the components, making notes of suggestions, and the like.

As can be seen in FIG. 2, the software can also provide a description of the location under consideration (hereafter the "Maintained Area"). Here, for example, Rough 1 is being considered for expansion, which would result in a reduction of the fairway. Moving the cursor and suspending the same over the rough will cause the definitional information "Rough 1" to be displayed. That description can be modified or edited, as desired by the Course Officials or other User.

Figure 3:
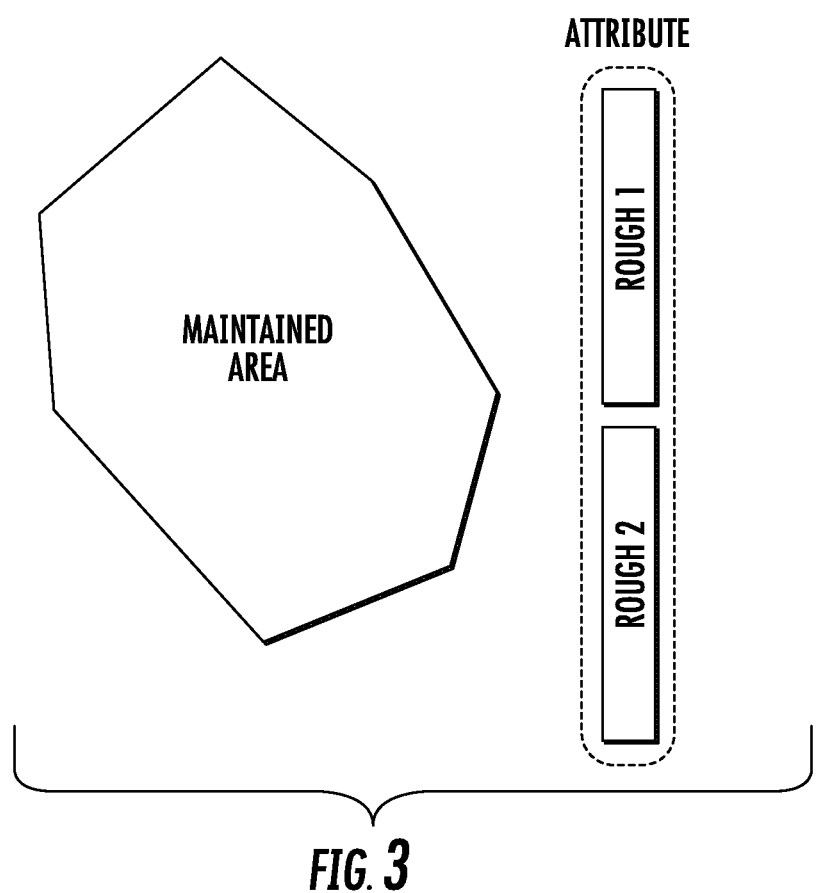
FIG. 3 shows an example of a polygon and options for designating the polygon as either Rough 1 or Rough 2 where Rough 1 and Rough 2 have different attributes and thus different maintenance expenses and resource consumption values.

FIG. 3 shows the visually displayed image of the Maintained Area under current consideration, bound by a solid line. The Maintained Area and image thereof could be the entire course, one or more holes or even a single Course Component. Drop down menus, in this case for "Attributes," are provided which indicate that this Maintained Area is currently composed of both Rough 1 and Rough 2.

Figure 4:
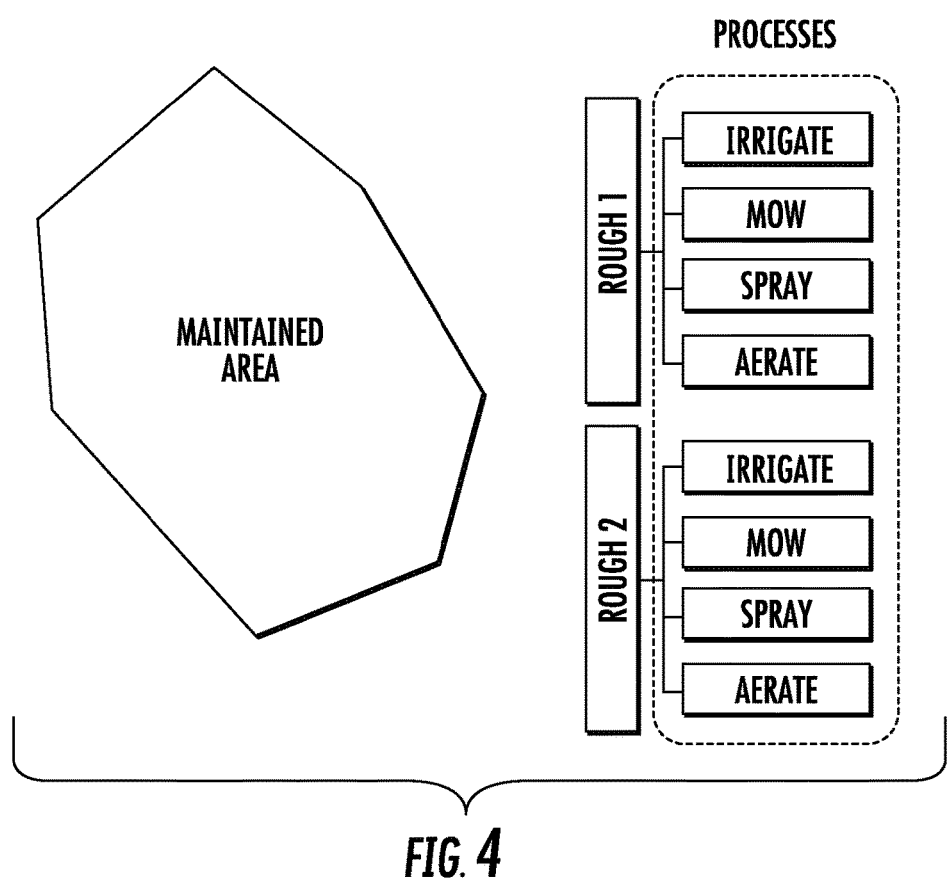
FIG. 4 also shows an example of a polygon and options for designating the polygon as either Rough 1 or Rough 2 where Rough 1 and Rough 2 have different attributes and thus different maintenance expenses and resource consumption values, with those expenses being shown as Processes associated with each rough type.

FIG. 4 is a view of the computer's visual monitor or screen display, again showing the Maintained Area under consideration for course maintenance, i.e., Rough 1 and Rough 2. The Processes which are necessary for maintaining Rough 1 and Rough 2 within the Maintained Area under consideration are now displayed. These include irrigation, mowing, spraying (insecticide, pesticides, herbicide, etc.), and aeration to promote healthy growth of the rough. These Processes will generally change based upon the Course Component under consideration. For example, if the location under consideration was the fairway of a hole, the Processes would indicate that seeding, mowing, annual aeration, trimming, etc. were necessary to maintain the fairway.

Figure 5:
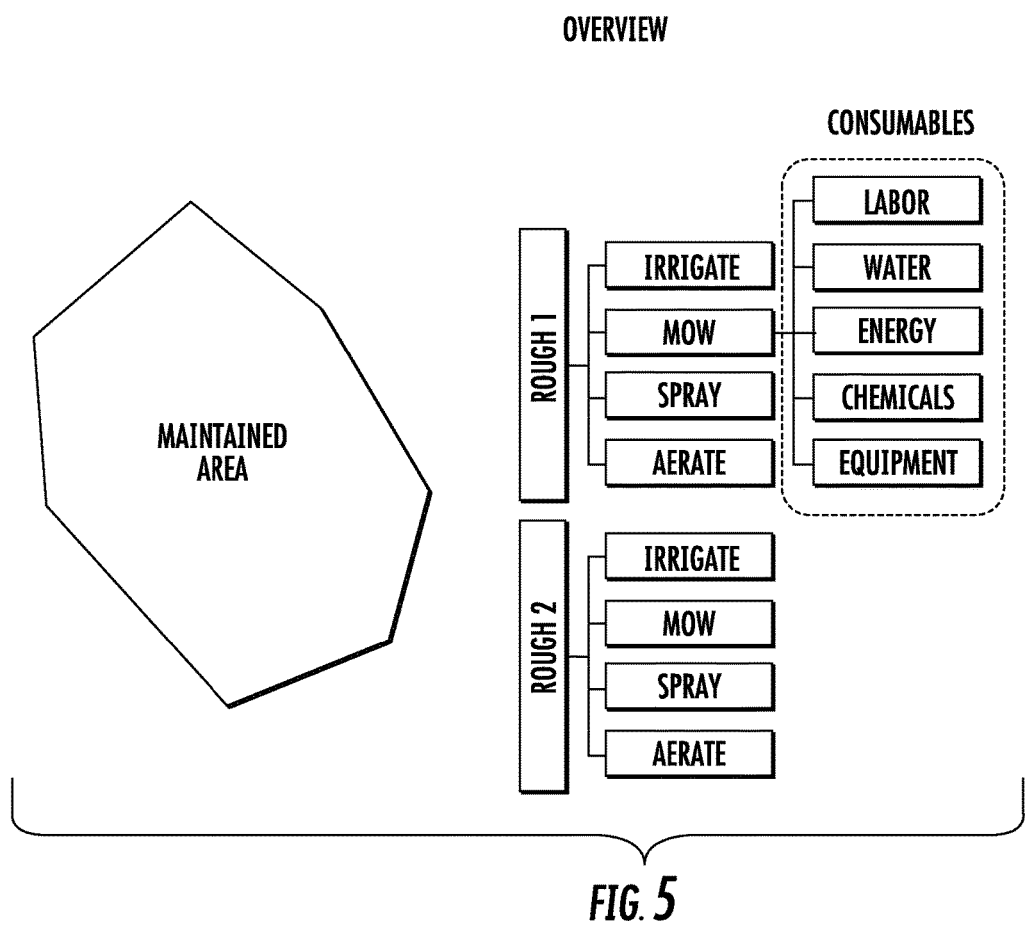
FIG. 5 shows an example of the Consumables, i.e., expenses, associated with a Process of a particular section of a Course Component, which in the illustration is a rough, e.g., labor, water, energy, chemicals, and other supplies, each of which will be taken into account by the system when estimating the cost of maintaining the golf course.

FIG. 5 shows the next visual screen which can be reviewed by the Course Officials in connection with the Maintained Area, here Rough 1 and Rough 2. As previously noted, Rough 1 is subject to the Processes of irrigation, mowing, spraying, and aeration. On this screen, there is now a listing of the Consumables which are associated with the various Processes, which include labor costs, water usage and costs, energy (electric or fuel) costs, chemicals (e.g., herbicide, and fertilizer), equipment wear and other supplies. Depending upon the Course Component under consideration, the Consumables will change as the Processes to maintain such Course Component correspondingly change. Although many of these changes will occur based upon information pre-programmed by the computer software system provider, the Course Officials will have the ability to modify the same as they deem appropriate for the course and hole(s) under consideration.

Figure 6:
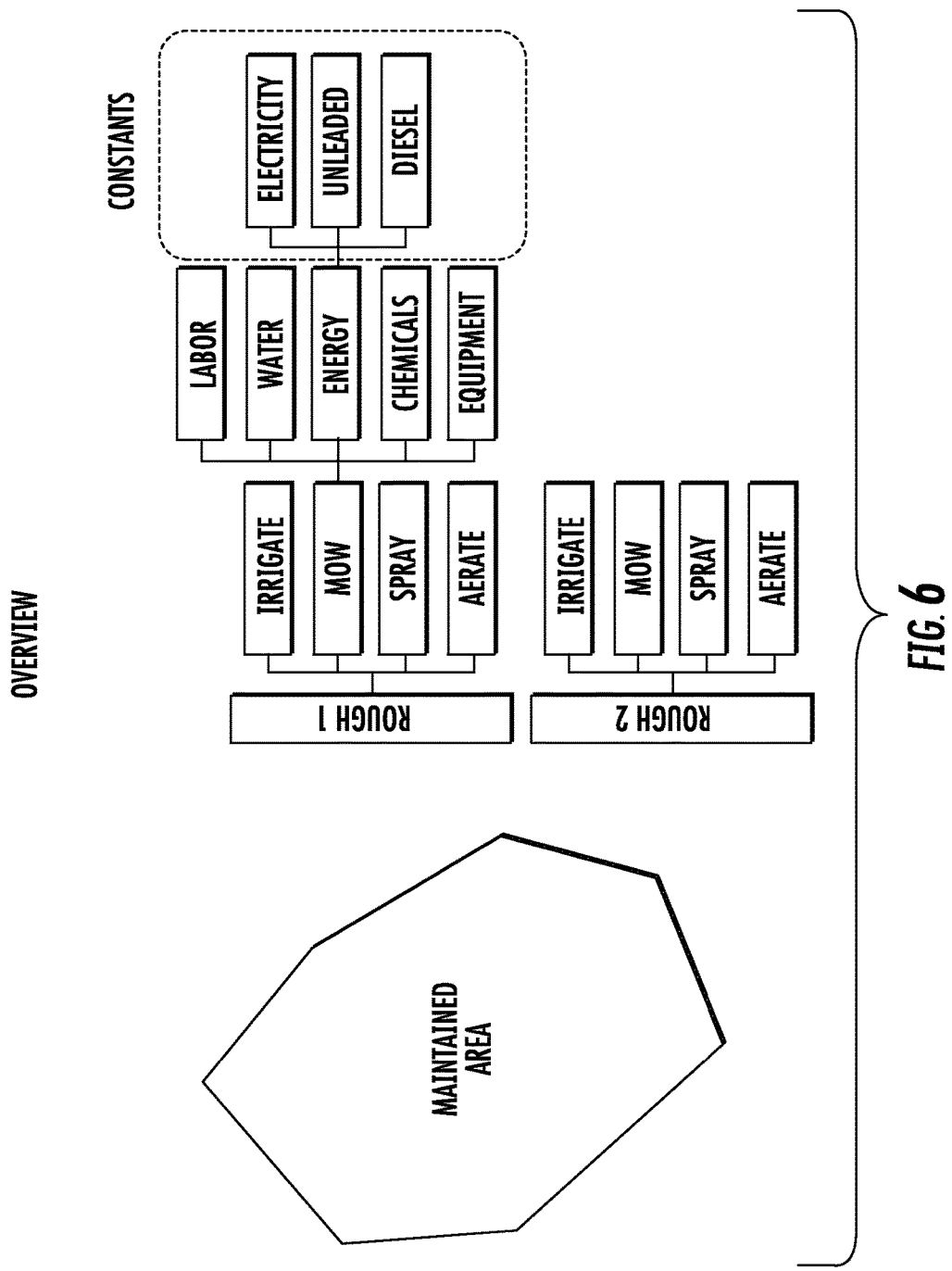
FIG. 6 shows an example of the constant expenses associated with a Consumable such as energy, which can take the form of electricity, unleaded gasoline and/or diesel fuel.

FIG. 6 displays another drop down menu for the software. There are certain constants which will always need to be factored into the cost of any modification of the holes and the Course Components. In FIG. 6, the constants that make up the cost of energy are shown, including the costs of electricity, unleaded fuel to power the mowers and diesel fuel to power other equipment. For the first use of the system software, the constants are input and remain in the input amounts until changed. If, for example, the Course Officials wanted to see what the cost of energy would be to irrigate, mow, spray and aerate the Maintained Area under consideration, the constants for such costs would already be input the first time they went to use the system. Clicking on the Electricity submenu will allow the Course Officials or other User to input for the cost of the electricity which dollar amount (per unit time or other variable) will be used for the analysis of the modification of the Maintained Area. For example, if the cost of electricity is 17 cents per kilowatt-hour and the cost of Unleaded Fuel is $1.50 per gallon, the Course Officials can enter these amounts as requested by the system and then use them to calculate the current and modified cost to maintain Rough 1 and any other Maintained Area or Course Components under consideration.

Figure 7:
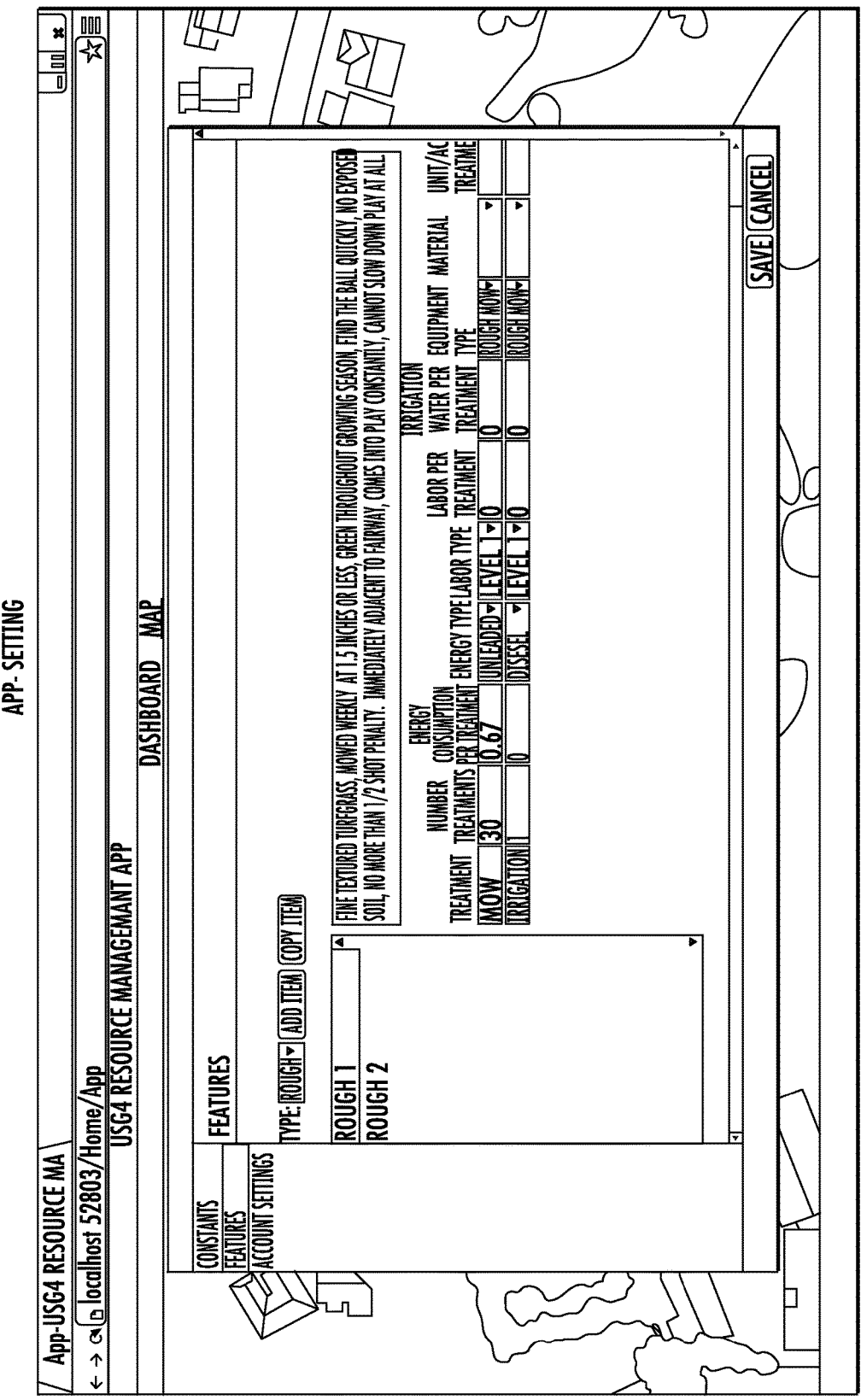
FIG. 7 is an illustration of one potential embodiment of a user interface of the system which allows the User to enter specifications (such as energy consumption or frequency for mowing and irrigation) and enables the User to customize the system for the particular golf course.

FIG. 7 shows an interactive screen provided to the Course Officials or other User of the system. In this example, the maintenance costs of both Rough 1 and Rough 2 of a particular hole(s) of the entire course are being evaluated. An interactive "box" is provided (which can be selectively modified or edited) to describe the nature of the area under consideration, e.g., the definition of Rough 1 is provided, i.e., "fine textured turf grass, moved weekly at 1.5 inches or less, green throughout growing season, find the ball quickly, no exposed soil, no more than ½ shot penalty, immediately adjacent to fairway, comes into play constantly, cannot slow down play at all." This definition of Rough 1 makes it clear that it: (a) is a boundary of the fairway and hazards as well as the putting green; (b) has certain well-defined attributes; (c) requires a certain degree of attention throughout the months to maintain it; (d) is often the area where a ball may come to lie; and (e) on average, per group of four (4) players playing the hole, one half (½) of a penalty shot is assessed for a ball lying in that area. This criterion and definition can be easily modified by the Course Officials as desired.

Also shown in FIG. 7 on the same "page" of the graphical user interface are the related Processes which need to be performed to maintain Rough 1 and the constants for such maintenance. For example, to maintain this area of Rough 1, the computer has been input with information indicating that there is a necessity to mow and irrigate the area. For example, the mowing, based on the quality of the Rough 1 desired, is to take place about 30 times annually. The irrigation is also a periodic occurrence that depends heavily on the local climate. The energy cost of the mowing per treatment is about 67 cents for the unleaded gas consumed per treatment. The labor required for the mowing is considered low level or, as described on the page, "Level 1." The various items that together make up the costs to maintain this area of Rough 1 are reflected.

Continuing with FIG. 7, when the boundary line(s) are moved (by selecting, moving and then dropping the pick up points of a boundary of a Course Component) on the hole or the course and, for example, a section of fairway becomes Rough 1, the fairway will have a corresponding decrease in its overall maintenance cost (less labor, materials, water consumption, etc.), while the now larger Rough 1 will have greater maintenance costs for mowing, labor, insecticide, fertilizer, and the like. The CPU of the computer will allow the Course Officials to move the boundary of the Maintenance Area under review and, as a consequence, the algorithm(s) of the underlying program will recalculate the cost (based on the new surface area) to maintain the changed area, as well as any changes in the cost to maintain adjacent areas which have either decreased or increased in size, and the net or overall effect of such changes.

FIG. 8 shows a screen shot which summarizes the costs associated with the Consumables and allows the Course Officials to modify such costs by making inputs to the algorithm for calculating the costs associated with maintaining the various Maintained Areas of the hole(s) and course. As seen in FIG. 8, the Unleaded and Diesel, Propane and pumping costs for those fuels are set forth, Diesel fuel is reflected as having a price of about $3.25 per gallon. Unleaded gas is reflected as having a cost to purchase and consume at about $2.50 per gallon. Labor costs are also reflected and can be modified on this input page, e.g., Labor, Level 1 is listed as having a cost component of $10 per hour, while Labor, Level 2 shows $15 per hour as its cost. Level 1 is less expensive because it might only apply to labor who only drive lawn mowers. Level 2 is more expensive because those individuals may need more training and/or education and require more skill. The cost for local labor can be input by the Course Officials to reflect actual costs and labor, or other levels can be input. All of these labor costs will also be used in the algorithm for calculating costs of maintaining various components of the hole(s) and the course as the Course Officials then seek to make changes or modifications to the various Maintained Areas as described above.

Material Costs, Equipment Costs, and other Costs which factor into the cost to maintain various areas and types of Course Components, e.g., teeing ground, fairways, rough, water hazards, bunkers, and putting greens, will be entered on a page similar to that shown in FIG. 8. Those costs can be input and maintained or can be modified as conditions change or are considered for change.

Figure 9:
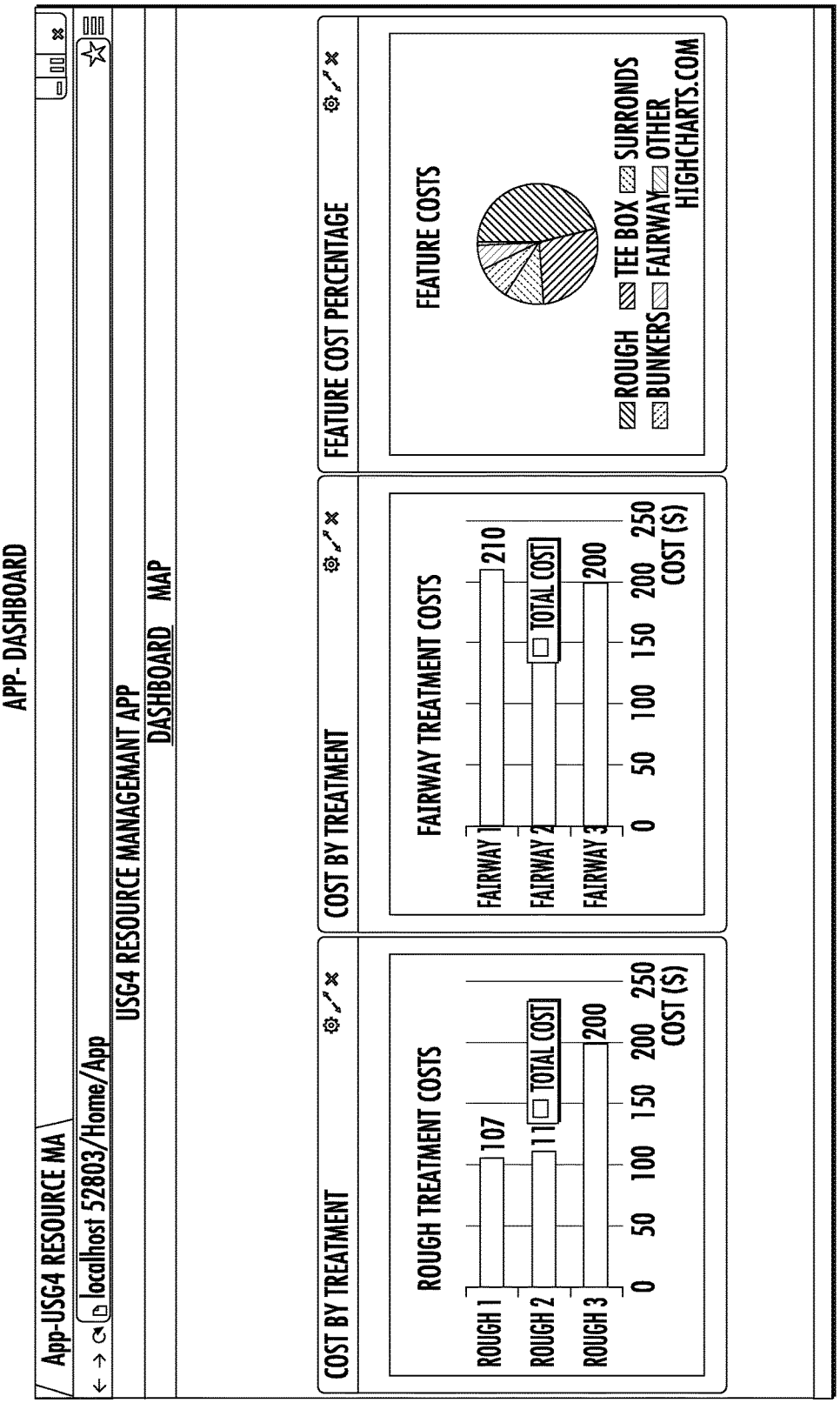
FIG. 9 illustrates possible visual outputs of the system showing graphs of the costs of different aspects of the course.

FIG. 9 is another screen shot of the graphical user interface for the current preferred embodiment of the present invention. It shows a Dashboard that allows the Course Officials to review certain calculations and matters of interest to the use of the application, especially in connection with consideration of changing or modifying any one or more holes of a golf course. In the leftmost graph is shown a bar chart reflecting the relative and actual cost for various Course Components. As can be seen, Rough treatment Costs can either be Rough 1 or Rough 2 (more rough than Rough 1 or higher/taller grass and thicket) or even a Rough area referred to as "Rough 3" (even thicker, non-grass, pine needles, woods, arbor areas, etc.). Here, Rough treatment costs for Rough 1 are about $107 per Unit of Area, which is 1,000 square yards. The cost to maintain Rough 2 is approximately $110 per Unit of Area, while Rough 3 has a cost of about $95 per Unit of Area. This graphical representation, based on the input of data regarding Consumables, Processes, area size and other factors can facilitate the Course Supervisor in their decision(s) as to how to change or modify the outer boundaries of the various Course Components and areas and the resulting savings or increases in maintenance costs as a result.

The middle graph on FIG. 9 is a similar bar chart for fairway treatment costs in relative and actual dollar estimates based on the inputted data, dimensions of the course, necessary Processes to maintain the fairway, and the Consumables which are provided, along with cost information by the Course Officials. This data and graph will be helpful to Course Officials or other User in modifying the parameters (boundaries, shapes, configurations) of the various Course Components of the hole(s) of the golf course.

FIG. 9 also shows a representative graphical illustration meant to facilitate the proposed change or modification and thus maintenance of the course with limited and available resources. The leftmost pie chart shows how the various Course Components, e.g., teeing ground, fairways, rough (all levels), water hazards, bunkers, and putting greens together comprise the costs for Golf Course Maintenance. The illustration shows how much is being consumed by the course for each of the various Course Components in actual estimated costs and relative costs. Clicking on any one of the pie sectors will allow the Course Officials to "dig deeper," i.e., to understand the processes involved to maintain that Course Component, the costs associated with such maintenance (e.g., labor, time, and machinery) and the cost of the Consumables (e.g., water and fuel). The application will allow the Course Officials to understand the various elements of cost to maintain the course and thereby gain the valuable knowledge necessary so that they can cut, maintain or even increase some costs, while at the same time maintaining the playability, beauty, challenge and enjoyment of the course. By using the information provided on the various screens, which information is based on many fixed and variable parameters, the Course Officials can make intelligent decisions as to how to consider changing or modifying the hole(s) of the course and the consequences of those changes and modifications on maintenance costs.

As previously noted, the Course Officials are meant to make modification decisions, i.e., changes to the shape, configuration and boundaries of the various Course Components and locations of the holes, by use of a mouse-like interactive device or trackball which will allow the virtual change of the boundaries to be made as desired, while at the same time providing an instantaneous recalculation to the Course Officials or other User of the resulting change in maintenance. When considering the making of such changes and modifications, the Course Officials can be considering the frequency at which golf balls come to rest in locations of the different sections of the golf course as provided by the preliminary tracking of the players around the course. This is expected to provide great flexibility to the Course Officials as they consider where to cut back on fairways, how to shape and enlarge hazards and putting greens, extend teeing grounds, and the like. In addition, the software can make suggestions for changes based on the tracking results and the desired maintenance costs per hole or the entire course. These can be individually reviewed by the Course Officials and implemented as desired.

When the course is suitably redesigned on the virtual golf course, the Course Officials can implement the changes and modifications on the actual course. Doing so should lead, within reasonable margin of error, to a reasonably estimated calculation of the new maintenance costs for the course.

To use the present inventive system and software, the Course Officials need to take various preliminary steps. First, according to the preferred embodiment of the present invention, a set of players, preferably more than fifty and ideally more than 100, with a Handicap Index ranging from high to low, should be asked to play one or more rounds of golf on the course. Their travel around the course to find their balls hit from the teeing ground and from their second and subsequent shots wherever they may land should be tracked. This can be done in a variety of ways, including, for example, by: (a) geo-location via smart phones; (b) dedicated sensors and transmitters to receivers about the course; and (c) tracking the players and their ball locations individually by use of sensors on players, carts, bags, etc. A plotting of the locations of the players for their preferred multiple rounds is acquired and provides a set of data inputs showing, when overlaid on the graphical parameters of the virtual course, the likely locations for balls hit by the players, from the teeing grounds, fairways, Rough 1 and Rough 2, hazards, traps and even from out of bounds. This information will guide the Course Officials as they consider where and how to modify the contours of the course for maintaining, cutting and/or modifying Golf Course Maintenance costs.

The Course Officials also need to input the software's database with the parameters and constants (at least at that moment), of certain costs, e.g., fertilizer, water, labor (low and high level), fuel, energy, chemicals and whatever other materials must be paid for and are needed to maintain a golf course on a unite of surface area basis.

Along with the costs of all these necessary items, information regarding their usage must be acquired and input into the database. If the cost of fertilizer is $100 per bag for example, it is necessary to ascertain the surface area of distribution for one bag. It may be that one bag covers 5,000 square feet of putting green. The same information is necessary for the other necessary materials. Data regarding fuel usage, water consumption, the efficiency of the laborers, and the like all need to be attained or approximated, per surface area of the golf course. Laborers, for example, are paid generally at a set rate of dollars per hour, e.g., $10 for low level and $15 for high-level laborers. The Course Officials need to ascertain or approximate the number of square yards of course, depending upon the component being attended to, that the laborer can complete in an hour. It may take one low level laborer one hour to mow the putting green on the second hole and only one half hour to mow the putting green on the $16^{th}$ hole. A high level laborer may need to attend to rough and bunkers on those same holes, with edging and/or trimming taking, for example 45 minutes and further grooming taking one hour. This data can be important as it shows the cost per unit area of Course Component which is useful in the redesigning of the Course Components and the recalculation of Maintenance Costs.

Data needs to be input, based on actual time spent, for the maintenance of all Course Components, including teeing ground, fairways, rough, water hazards, bunkers, and putting greens. To the extent available, this information should be utilized because it likely represents the most accurate data for the particular course under consideration. Alternatively and/or as a supplement, the software can use reasonable estimated data taken from courses in the same general geographic area or other data which is considered reliable.

The Course Officials need to input, as well, a reasonable set of outlines and data points for the holes of the course, including their shape, size and dimensions. This can be done by overlaying the course on a grid supplied by the software and the software taking the same and approximating the measurements and surface areas of the course. Alternatively, the Course Officials can take appropriate measurements at each hole, just as is done for the length of the same from teeing ground to the hole on the putting green. Information regarding the curvature of the fairways with respect to the teeing ground, Rough 1 and Rough 2, water hazards and bunkers are all preferably entered into the software as data points on a simple x-y graph for both the hole and overall course. Preferably, dimensions and shape are ascertained and known for each hole.

As a consequence of the data input into the software of the dimensions and shapes of the holes and overall course, the software will calculate the surface area of each of the Course Components. Hole 1, for example, may include: (a) a teeing ground of 10 yards by 20 yards for a total surface area of 200 square yards; (b) a fairway with a distance of 420 yards from the edge of the teeing ground to the edge of the putting green and an average width of 35 yards for a total surface area of 14,700 square yards; (c) Rough 1 measuring 15,000 square yards and Rough 2 measuring 13,000 square yards; and (d) a putting green of 700 square yards.

The software and CPU will calculate the square area of the various areas of each section of each hole according to one or more suitable methods for approximating such area, all by using the input data. One suitable method is to use polygons within each area of different sizes and summing up the areas of the polygon until substantially all of the surface area and the curvature of the configuration of the hole is substantially taken into account. For other sections of the course, other methods of reasonably calculating their surface area may be utilized.

The software will allocate a suitable number of pick up points to the boundaries of each Course Component of each hole on the course. Some pick up points may be unmovable as where, for example, they abut physical locations where the hole of the course cannot be moved toward or away from. For example, if a particular teeing ground is located within a few yards of a side boundary for a road or highway, that edge of the teeing ground cannot be moved.

Similarly, where a water hazard is substantially defined by a pond whose shape and size is required for proper drainage, that water hazard may not be movable.

In most cases and with respect to most Course Components, however, many pick up points are allocated to such components' boundaries. For example, a right side boundary for a hole which doglegs left at 325 yards from the teeing ground may be provided with 10 or more pick up points for the 325 yards from the teeing ground to the start of the left-curve for the dogleg, with each pick up point being suitably spaced from the adjacent pick up point. Other configurations and locations of pick up points can be assigned to each of the boundaries of the various components.

Pick up points can be assigned by the Course Officials or other User automatically by the software. Each pick up point allows the Course Officials to use a computer implement, e.g., a mouse, to select/pick up, drag and move that pick up point, holding the boundary line intact, and to then drop the pick-up point at a new location. The pick up points are generally connected together so that movement of one pick up point will likely cause two other pick up points to move. This action will cause the CPU of the software to recalculate the square yards of the particular Course Component, whether it is the teeing ground, fairway, rough, water hazard, bunker or putting green. As one component may decrease in surface area, another may correspondingly increase because of the relation of boundary lines. For example, in many locations the boundary line of the fairway is tied to Rough 1, while the boundary line of Rough 1 is tied to Rough 2. Moving one such boundary line necessarily impacts upon the movement of the adjacent Course Component.

As the changes and modifications are being made, the CPU and software will be calculating the maintenance costs for revised or modified areas of the Course Components so that the Course Officials will be able to instantly appreciate how their act of changing the boundaries of the various components will impact that component's maintenance cost. The maintenance costs of the various Course Components will be summed for each hole and an overall cost and amount of consumed resource assigned to the holes. The entire course will be displayed to the Course Officials or other User.

As the course's boundaries are modified, the software will provide an indication of how the overall course will be maintained and the cost of such Golf Course Maintenance. The square yardage of a Course Component, as modified, will be multiplied by the items of cost to maintain the particular component, e.g., Consumables, labor, time, water consumption, to derive the approximate cost to maintain that component.

For example, a 14,700 square yards fairway may be modified (or under consideration for modification) by reducing its size to 13,700 square yards by "shaving" 1,000 square yards from an area where player's shots seldom if ever land as determined by the tracking component of the present system. That 1,000 square yard reduction in fairway size may result in a course maintenance savings, including for labor and fuel for mowing, and water, fertilizers and chemicals to maintain healthy turfgrass. That 1,000 square yard reduction, however, may also result in an increase in the square acreage of Rough and, as a consequence, an increase in the maintenance costs for that area. The CPU and software will net the fairway decease with the Rough 1 increase and present the revised and modified hole to the Course Officials, who will immediately know how their contemplated shaving of the fairway will impact on the overall maintenance of that hole.

The Course Officials will consider how to increase, maintain, or decrease, the Maintenance Costs of the various Course Components while keeping a mindful eye on how often the players historically frequent a location on the course as they play their round. In this manner, the Course Officials will be able to reduce Golf Course Maintenance costs or maintain such costs without significant impact on the playability, beauty, challenge and enjoyment of the overall course. After actual implementation of the changes to the course, the players may continue to be tracked or monitored to ensure that the changes made do not seriously impact upon the playability, beauty, challenge and enjoyment of the course. If necessary, the course can be further modified.

The movement of the pick-up points is expected to be somewhat intuitive as one or more pick up points will be "connected" on the boundary line to the movement of adjacent pick up points. For example, the outward movement of the center 5 pick-up points on a side fairway boundary to increase the width of the fairway will cause the two adjacent (on each side) pick up points to correspondingly move. Stated otherwise, the pick-up points are always substantially connected to one another by a common boundary line which basically defines the shape of the particular Course Component.

The course can be modified hole by hole and component by component, all the while ensuring that, based upon the data previously derived from tracking the players, locations which players frequent when they play are not impacted or are given due consideration for changes or modifications, while maintenance for areas which are infrequently played can be reduced. The Course Officials or other User is expected to manually modify the course or the software can do so automatically (based on frequency of balls being hit to locations and cost savings) or at least alert the Course Officials of the consequences of a proposed modification. In addition, the revised and/or modified course can be reviewed to ensure it is still appropriate for the players by tracking them after the modifications are actually implemented. With this new data, further modifications may then be considered.

After the modifications to the virtual course as set forth above are finalized, the changes are expected to be implemented to the actual golf course. Before actually doing so, however, the Course Officials or other User is provided with back up of the anticipated savings (or lack thereof) of the changes to the Golf Course Maintenance costs and resource consumption. Changes to the dimensions and shape of the various Course Components, e.g., teeing ground, fairways, rough, water hazards, bunkers, and putting greens, and the impact of such changes on Golf Course Maintenance costs are expected to be considered prior to such implementation on the actual course. Again, using the tracked information of the location and frequency of players at the various holes on the course can facilitate the consideration and implementation of the modifications to the course, hole by hole, while maintaining the courses overall playability, beauty, challenge and enjoyment.

What we claim is:

1. A virtual golf course maintenance system comprising:
   a) a virtual golf course formed from a plurality of Course Components for one or more holes of said golf course, and a visualization means for visually viewing the virtual golf course on a device;
   b) a CPU connected to a data input device providing a means for inputting said Course Components of said golf course and one or more factors associated with maintenance costs and consumable resources for the Course Components of the virtual golf course;
   c) a manual input means for virtually modifying any one or more of the boundaries of the Course Components of said virtual golf course; and
   d) said CPU providing visual confirmation of proposed boundary modifications of the Course Components of said virtual golf course and an anticipated change in said maintenance costs and consumable resources automatically in response to the proposed boundary modifications.

2. A virtual golf course maintenance system as claimed in claim 1 wherein said Course Components of the virtual golf course are any one or more of the following: teeing ground, fairways, rough, water hazards, bunkers, and putting greens.

3. A virtual golf course maintenance system as claimed in claim 1 wherein said maintenance costs and consumable resources are calculated by said CPU and based on input parameters of any one or more processes for maintaining the Course Components.

4. A virtual golf course maintenance system as claimed in claim 1 wherein said manual input means for modifying is accomplished by a mouse-type computer interactive device configured to select, pick up, drag, move, and reset any one or more of said boundaries of said Course Components.

5. A virtual golf course maintenance system as claimed in claim 1 wherein said maintenance costs for said Course Components comprise the cost of any one or more of labor and consumables including water, fuel, energy, fertilizers and/or chemicals.

6. A virtual golf course maintenance system as claimed in claim 1 wherein said calculation of maintenance costs and consumable resources of said Course Components are based on summing of the surface areas of polygons within or approximately within the boundaries of said Course Components and multiplying by the maintenance costs and consumable resources applicable to said surface areas of polygons.

7. A virtual golf course maintenance system as claimed in claim 1 wherein the modification of said boundaries of said Course Components is visually represented on said device and proposed movement of said boundaries is accompanied by corresponding movement of adjacent sections of said boundaries of said Course Component to maintain the general configuration of said golf course.

8. A virtual golf course maintenance system as claimed in claim 1 wherein said CPU provides a recalculation of the anticipated maintenance costs of said golf course and/or consumable resources upon proposed modification by changing the virtual boundaries of said Course Components of one or more of said holes of said golf course.

9. A virtual golf course maintenance system as claimed in claim 1 wherein said proposed modifications to said boundaries are performed by said CPU with regard to the statistical frequency of travel of actual players to an actual golf course corresponding to said virtual Course Components and to said proposed modified areas of said Course Components.

10. A virtual golf course maintenance system as claimed in claim 9 wherein said frequency of travel of players to said virtual Course Components is based on a set of actual players who play an actual course resembling said virtual golf course and said players are tracked by sensor and transmitters of their position on the actual golf course.

11. A virtual golf course maintenance system as claimed in claim 9 wherein said modifications are made while attempting to maintain any one or more of the actual playability, beauty, challenge and enjoyment to players on the golf course which is virtually represented on said device.

12. A system for golf course maintenance as claimed in claim 1 wherein the results of the modifications of the boundaries of any one or more Course Components of any one or more holes of the virtual golf course are implemented to an actual golf course.

* * * * *